Oct. 30, 1951  S. W. BRIGGS  2,572,981
SUPPORT FOR FILTER ELEMENTS
Filed June 10, 1946  4 Sheets-Sheet 1

Inventor
SOUTHWICK W. BRIGGS

By Semmes, Keegin, Beale and Semmes
Attorneys

Oct. 30, 1951  S. W. BRIGGS  2,572,981
SUPPORT FOR FILTER ELEMENTS
Filed June 10, 1946  4 Sheets-Sheet 3
FIG. 3
FIG. 4
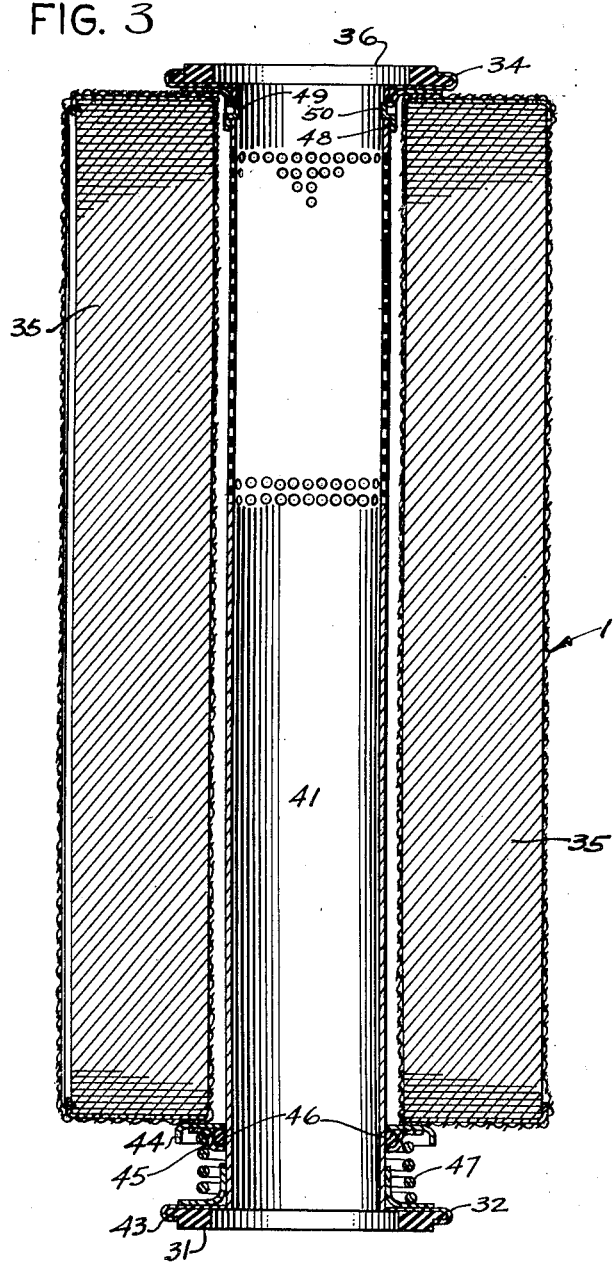
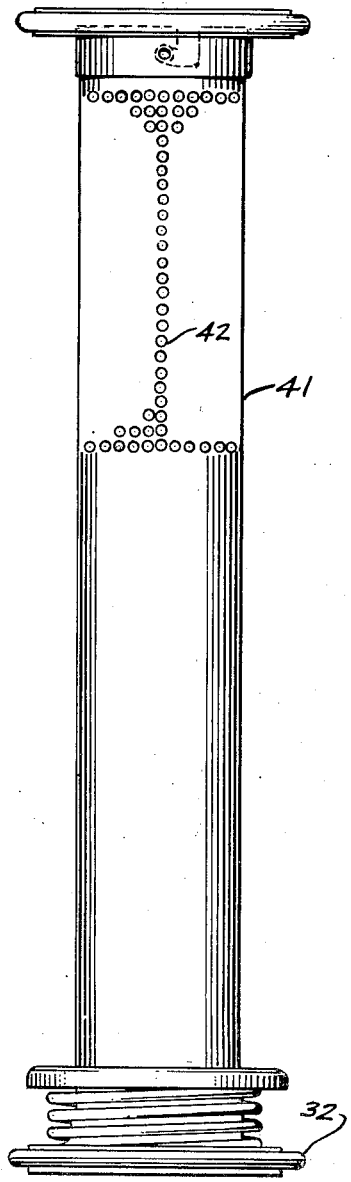
Inventor
SOUTHWICK W. BRIGGS
By Semmes, Keegin, Peale and Semmes
Attorneys Oct. 30, 1951  S. W. BRIGGS  2,572,981
SUPPORT FOR FILTER ELEMENTS
Filed June 10, 1946  4 Sheets-Sheet 4

Inventor
SOUTHWICK W. BRIGGS

Patented Oct. 30, 1951

2,572,981

UNITED STATES PATENT OFFICE 2,572,981

SUPPORT FOR FILTER ELEMENTS

Southwick W. Briggs, Washington, D. C.

Application June 10, 1946, Serial No. 675,645

10 Claims. (Cl. 210—184)

1

This invention relates to the art of filtration and more particularly to a harness upon which filter masses may be mounted within a filter casing.

Considerable difficulty has been experienced with filters because of shrinkage of the filter material during the period of operation of the filter. This shrinkage, while serious in all types of filter masses, has been especially detrimental in filters of the disc type. Any shrinkage of the filter discs results in a loosened filter mass which provides a multitude of passages between the individual discs for the unfiltered fluid.

Various schemes have been tried in prior apparatus to overcome the failure of filter masses occasioned by the shrinkage of filter material. Usually these devices were difficult to assemble, were not positive enough in their action to compress the filter mass, or were not sufficiently rugged to withstand rough handling. Refill inserts of the filter mass for disc filters have been especially fragile.

It is an object of this invention to provide a harness for a filter mass which will compress the mass as any shrinkage of the filter material occurs.

Another object of this invention is to provide a filter cartridge which may be rigidly mounted within a filter casing.

It is also an object of this invention to provide a filter cartridge which may be quickly and easily replaced in the filter casing.

A further object of this invention is to provide a filter cartridge adaptable for use in a filter containing a plurality of filter cartridges.

Still another object is to provide a rugged unitary refill for a filter.

With these and other objects in mind, which will become apparent in the following description, this invention resides in a harness for filter cartridges which may be rigidly mounted within a filter casing and in which resilient means are provided for maintaining a tightly compressed filter mass.

In the drawings:

Figure 3 is a sectional view illustrating the construction of a complete filter cartridge including the filter mass and the filter harness.

Figure 4 is an elevation of the filter harness

2 illustrating the means for securing the upper flange to the central tube of the harness.

Figure 5:
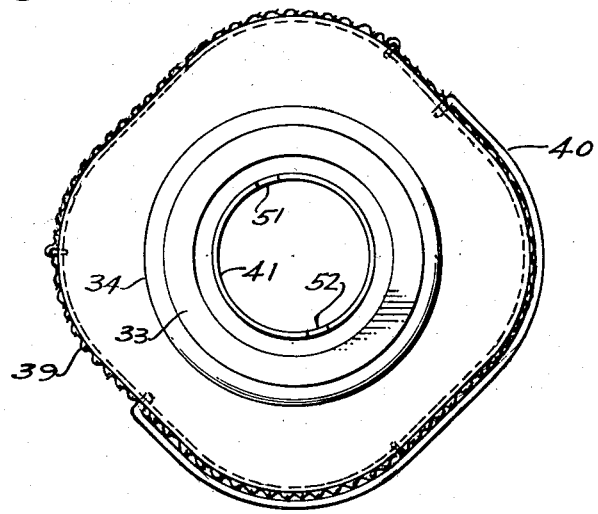

Figure 5 is a plan view of the assembly cartridge in which the filter mass is of a generally square shape.

Figure 6:
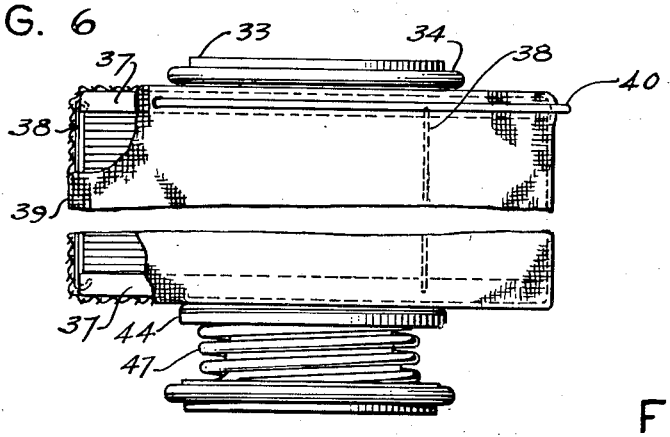

Figure 6 is an elevational view of a filter cartridge in which part of the covering is broken away.

Figure 7:
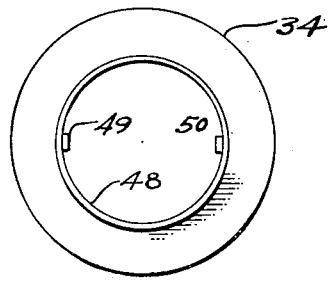

Figure 7 is a bottom view of the upper flange of the filter harness illustrating the projections which lock that flange to the central tube.

Figure 8:
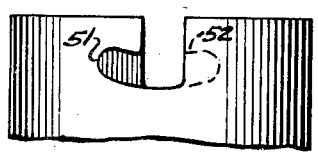

Figure 8 is an elevation of the upper end of the central tube illustrating the slots adapted to receive the projections of the upper flange.

Figure 1:
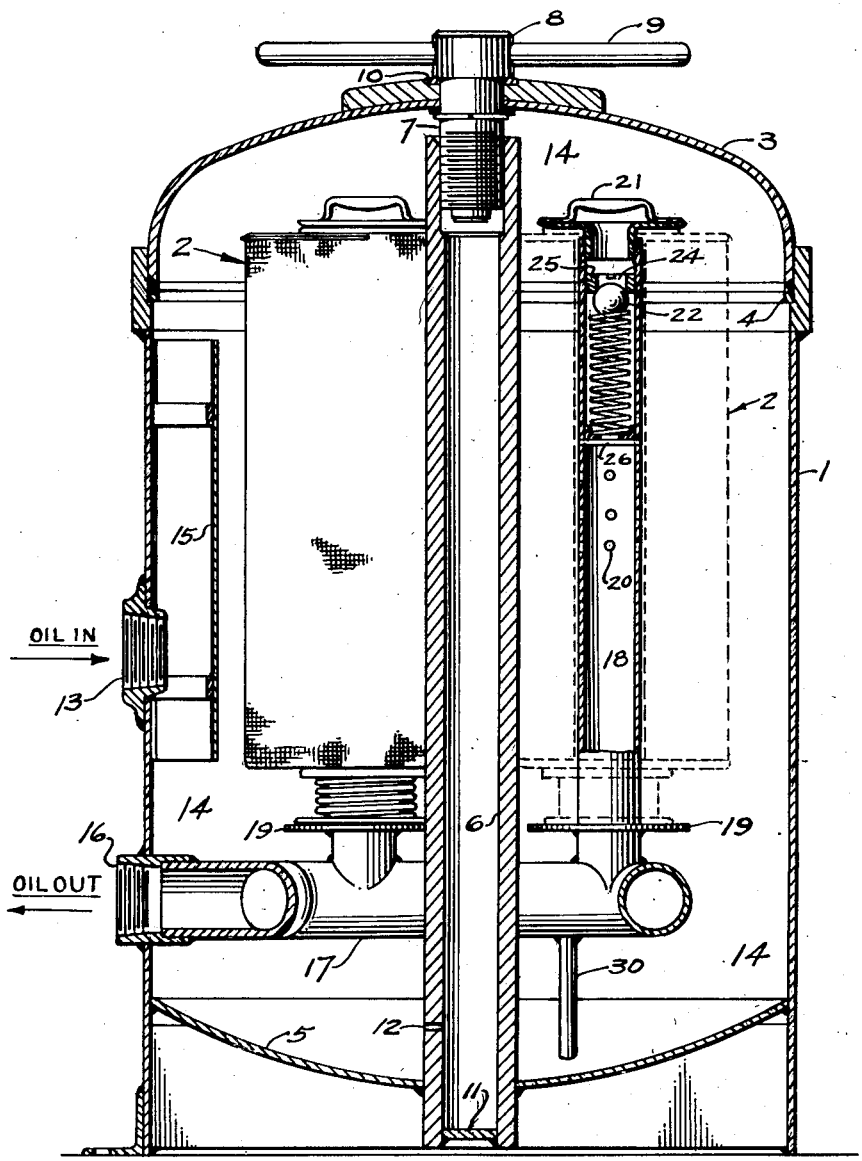
Figure 1 is a vertical section of a filter casing in which a plurality of filter cartridges are mounted.

Referring to Figure 1, a filter casing 1 is illustrated in which there are a plurality of filter cartridges, indicated generally as 2, operating in parallel. A cover 3 is held firmly against the upper end of the casing and leakage between those two parts is prevented by gasket 4. Extending longitudinally from the base 5 of the casing almost to the cover is a hollow tube 6 which is internally threaded at its upper end. A heavy screw 7 passes through the cover 3 of the casing and screws into the upper end of hollow tube 6 to hold the cover firmly and tightly against gasket 4.

At the upper end of screw 7, a hub 8 furnishes a base for a handle 9 and also bears against gasket 10 when the screw 7 is tightened to hold the cover in place and prevents leakage between the cover 3 and screw 7. A plug 11 is welded in the lower end of tube 6 to prevent leakage therefrom. Port 12 allows release of pressure in tube 6 and prevents blowing out plug 11 if tube 6 should be full of liquid when screw 7 is tightened. It is apparent that the cover 3 may be removed from the casing easily and quickly by simply loosening the connection between screw 7 and hollow tube 6. The large handle 9 allows spinning of screw 7 to speed the removal of the cover from the casing.

An inlet 13 in the side of casing 1 permits the flow of unfiltered fluid into the chamber, indicated generally as 14. Direct impinging of the fluid introduced to the filter against the filter cartridges is prevented by baffle 15 which directs the incoming fluid tangentially about the chamber 14.

Near the bottom of the casing and directly below the inlet 13 is an outlet 16 from the filter casing. Outlet 16 is connected with a discharge manifold 17 from which a number of drainage tubes 18 extend upwardly through the filter casing. These drainage tubes serve as supports for the filter cartridges and also as conduits for the removal of clarified fluid.

Shoulders 19 are welded to the lower end of drainage tubes 18 a short distance above the discharge manifold for the support of the filter cartridges. Openings 20 are spaced along the drainage tubes 18 for the passage of clarified fluid during the operation of the filter. The upper end of the drainage tubes is threaded internally to receive a spider-like cap 21 through which unclarified fluid may flow to the upper area of the drainage tube. Release for excessive pressure in the filter casing is provided by a spring loaded valve 22 mounted in the upper end of the drainage tube. A spring 23 constantly urges the spherical valve 22 upwardly into the opening 24 in disc 25 immediately above the sphere, thus closing that opening and preventing by-passing of the filter cartridge during normal operation. If the pressure in the chamber 6 becomes excessive because of a plugged filter cartridge, for example, sphere 22 is moved downward against the action of the spring, thereby allowing unfiltered fluid to pass through opening 24. At the lower end of the spring there is a hole 26 in the supporting plate 27 which provides an escape for the unfiltered fluid to the filter outlet.

Cap 21 is essentially a short section of pipe flanged at one end with a bar 28 across the face of the flange to act as a handle. The pipe section is threaded at 29 for engagement with the threads in the upper end of drainage tubes 18. Since cap 21 is, therefore, tubular, it does not interfere with the flow of fluid to the pressure release valve 22.

During the assembly of a filter, a complete filter cartridge comprising a filter harness and filter mass is slipped over a drainage tube 18 so that the lower end of the cartridge rests on shoulder 19. Cap 21 is then screwed on to the upper end of the drainage tube. Since the cap bears on the upper end of the filter cartridge, tightening of the cap holds the cartridge rigidly in place about the drainage tube 18 and between the shoulder 19 and cap 21. Thus each of the filter cartridges is firmly supported on the drainage manifold. Legs 30 are located at intervals around the circumference of the drainage manifold to increase the ruggedness of the structure.

Figure 2:
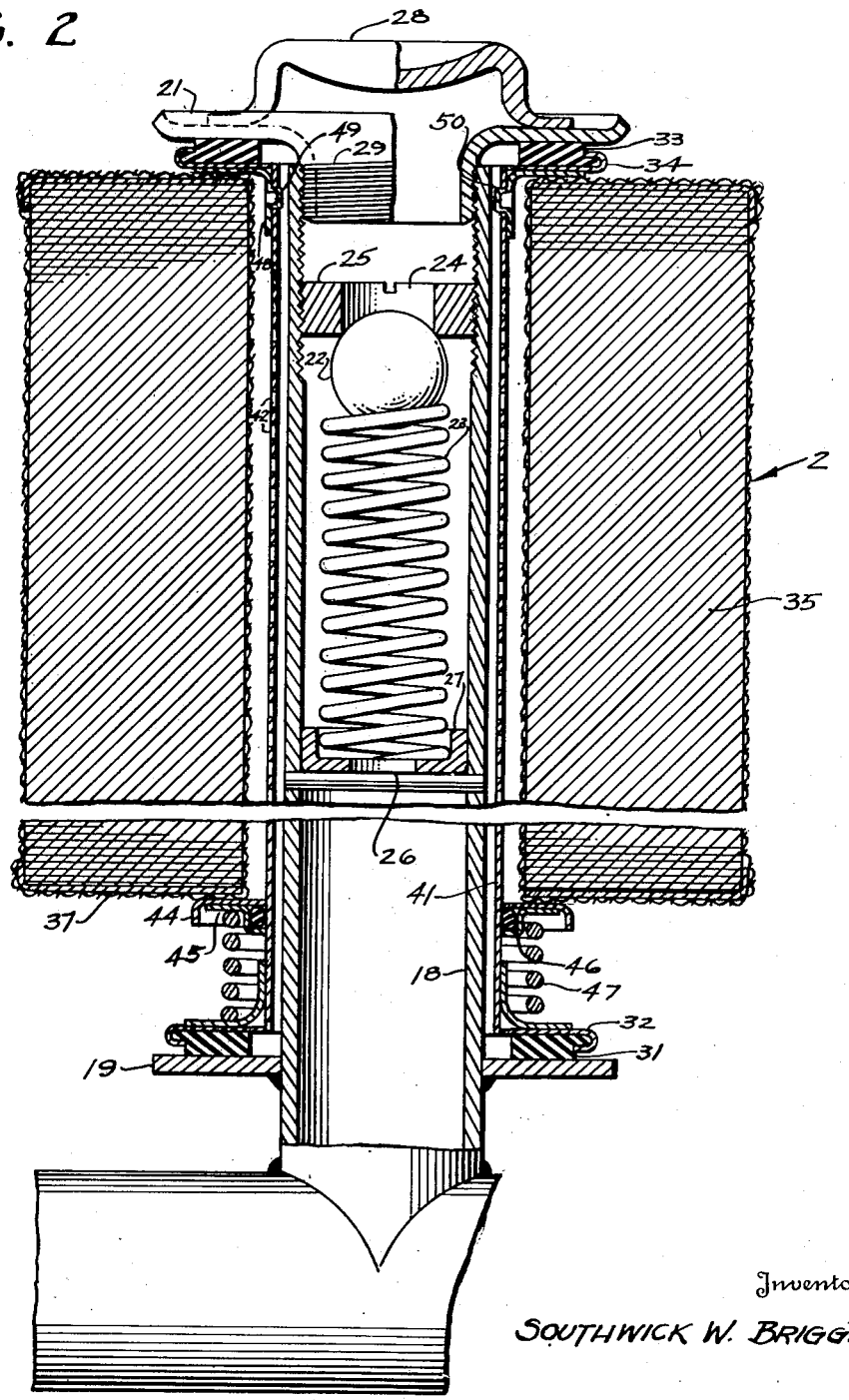
Figure 2 is a sectional view of one of the filter cartridges showing the details of its support on the outlet tube of the filter casing.

In Figure 2 the mounting of the filter cartridge 2 upon the drainage tube 18 is best illustrated. Gasket 31 prevents leakage of unfiltered fluid between shoulder 19 and the lower end flange 32 of the filter cartridge. Similarly, gasket 33 prevents leakage between the cap 21 and the upper end flange 34 of the filter cartridge. During the operation of the filter, contaminated fluid passes from the outside of the filter cartridge 2, generally radially through it, to the openings 20 in drainage tubes 18 and then to the filter outlet. In case of excessive pressure upon the filter casing, by-passing of the filter cartridge through valve 22 is possible.

Referring to Figure 3 a filter cartridge, indicated generally as 2, is illustrated in which a filter mass 35 is supported by a filter harness, indicated generally as 36. The filter mass may be of any of a number of types but it is anticipated that a filter mass of the disc type will generally be used. A filter mass of that nature consists of a series of discs, some or all of which are of a filter material, stacked to form a unitary structure having a bore extending longitudinally through the mass. The discs may be of any shape, but in most cases are round. However, because of more effective use of the filter material it is preferable that the discs be square, as shown in Figure 5.

In order to provide a rugged compact filter mass which will withstand ordinary handling and is suitable for use as a refill, plates 37 are placed at the end of the filter mass. The discs are then compressed and a connection 38 attached to the two plates 37 to hold them in fixed, spaced relation to each other. Upon release of the compressive force, the connection 38, which may be of wire, maintains the filter mass in a compressed condition of relatively high rigidity and strength. Often it is desirable to cover the filter mass with a cloth or sock, such as 39. This sock acts as a strainer during the operation of the filter and also contributes to the ruggedness of the refill.

In many cases, it is desirable to have a handle 40 attached to the upper plate 37 to facilitate the installation and removal of a filter mass. The handle illustrated in Figures 5 and 6 is merely a wire which after using may be placed around the edge of the plate 37, as shown in the drawings.

The filter harness itself is best illustrated in Figure 4 and consists of a central tube 41 with perforations 42 preferably located near the upper end. Then if particles of the filter material should become loosened from the mass, the perforated tube would act as a strainer. Secured to the lower end of the central tube is an end flange 32. This flange may either be welded, screwed, or rolled onto the central tube. In the form shown in Figure 3 a lip 43 is spun onto the face of the flange and forms a recess for holding gasket 31. With this construction, it is insured that a gasket 31 will lie between shoulder 19 and end flange 32 to prevent leakage of any unfiltered fluid between those two flanges into central tube 41. The possibility of the mechanic servicing the filter forgetting to install a gasket before placing the harness in position is eliminated.

A floating plate 44 is slidably mounted upon central tube 41 above end flange 32. Preferably this plate has a second plate 45 welded or otherwise attached to its lower surface to form a channel in which a sealing ring 46 may be installed. Sealing ring 46 may be made of neoprene or any other material suitable to prevent leakage between the floating plate and the central tube and resistant to the fluid being clarified. Between the floating plate 44 and flange 32 a helical spring 47 is supported concentric with central tube 41. When the filter cartridge is assembled, spring 47 is compressed; consequently, it constantly urges floating plate 45 and flange 32 apart.

A second end flange 34 is detachably mounted at the end of central tube 41 remote from flange 32. End flange 34 is attached to a short section of tubing 48 of a diameter large enough to fit closely over the outside of tube 41. Tube 48 is dimpled at 49 and 50 for engagement with slots 51 and 52 in the upper end of tube 41. Slots 51 and 52 should be generally L shaped with preferably an acute angle between the arms of the L so that the force of spring 47 acting through the filter mass 35 and thus pushing upwardly against end flange 34 will tend to lock dimples 49 and 50 more firmly in slots 51 and 52. It is preferred that flange 34, like end flange 32, have a lip spun on its face for the positive engagement of a gasket.

In the assembly of a filter cartridge the helical spring 47 is slipped down along the tube 41 until it rests against the flange 32 secured to the end of the central tube. Then floating plate 44 with the sealing ring in the recess is slid over the tube until it rests against spring 47. In some cases, it may then be desirable to place a gasket on the upper surface of floating plate 44. However, if the filter mass 35 is covered with a sock, such as 39 in the drawings, a gasket usually will not be necessary to prevent leakage between the floating plate 44 and plate 37 at the end of the filter mass. The filter mass is then placed in concentric spaced relation to tube 41 and rests on floating plate 44.

Detachably mounted end flange 34 is placed on the upper end of the filter mass and concentric with tube 41 and then pushed downward. Spring 47 is thus compressed and tube 48 slides over the outer surface of tube 41. It is, of course, necessary to align the dimples 49 and 50 properly so that they will slide into L-shaped slots 51 and 52. When the spring 47 has been compressed sufficiently so that dimples 49 and 50 prevent any further downward movement of flange 34, flange 34 is then turned and dimples 49 and 50 engage the lateral extensions of the slots 51 and 52 to hold the flange firmly in place. The assembled filter cartridge is then ready for placing in the filter casing.

An important feature of this invention is that the filter mass is continuously compressed by some resilient means. If the filter material shrinks, as is the usual case during the period of operation, the resilient means maintain the filter mass in a compressed condition and prevents by-passing of it by unfiltered fluid passing around the ends of the mass or between the individual discs.

Even though the filter mass is resiliently supported, the complete cartridge assembly is rigidly mounted within the filter casing. The rigid nature of the harness in which flanges are securely attached to the ends of a central tube allows the use of rigid means to support the harness. No matter how tightly the harness is held in position there is no undue compression of the filter mass because of the fixed position of end flanges 32 and 34 at the end of drainage tube 41. This advantage is obtained by the unique structure in which a slidably mounted plate is intermediate the ends of the filter harness and is entirely free from the action of any force used to hold the harness in place. Thus the compression of the filter mass is a result only of the action of spring 47 and is not influenced by the forces used to support the cartridge.

It is apparent that in order to replace a filter cartridge, it is merely necessary to remove the cover of the filter and then remove cap 21, which is screwed onto the drainage tube 18. The entire filter cartridge including the filter mass 35 and the filter harness may be then lifted from its position surrounding the drainage tube and an entirely new assemble put in its place. On the other hand, one of the advantages of this apparatus is that it is not necessary to replace the entire filter cartridge. The detachably mounted end flange 34 may be removed from the central tube 41 by turning the cap slightly and then lifting it. It is now possible to slide the filter mass 35 from its position on the filter harness and replace it with a new filter mass.

Inasmuch as the filter harness is made of materials considerably more resistant than the filter materials used in the mass, it is anticipated that replacement of the complete filter cartridge comprising the filter harness and the filter mass will be rare. After a new filter mass has been dropped in place the detachably mounted flange 34 may be easily installed, then the filter cartridge locked in place by cap 21. After replacing the cover 3 of the casing, operation of the filter may again be carried on.

The provision of end plates 37, held together by connections 38 supplies a filter mass of a very rugged nature. In spite of the rather delicate nature of most filter materials, the filter mass provided in this invention will withstand ordinary handling because of its tightly compressed structure. Further advantages from a standpoint of general ruggedness of construction are gained by the use of a sock around the filter mass.

An example of a filter cartridge in which the principal of this invention is used has been described in detail but it is to be understood that this invention is limited only by the appended claims.

I claim:

1. A support for a filter element comprising a casing having an opening providing communication between the inside and outside of the casing, a tube extending into the casing providing a conduit from the inside to the outside of the casing, a cover closing the upper end of the casing, a shoulder means secured to the tube, said tube having openings therein above the shoulder means, a perforate central tube encircling the tube and having a first end flange secured to one end, an annular plate concentric with and slidable on the central tube, resilient means between the first end flange and plate urging them apart, a second end flange detachably secured to the end of the central tube opposite the first flange adapted to engage a filter element in position around a central tube and hold it against the annular plate, means engaging the upper end of the tube and the second end flange on the central tube to hold the central tube firmly in position around the outlet tube, said shoulder means engaging the first end flange secured to the central tube, and means closing the end of the tube to prevent by-passing of the filter element by unfiltered fluid.

2. A support for a filter element comprising a casing having an inlet, an outlet tube extending into the casing, a cover closing the end of the casing, shoulder means secured to the outlet tube, said tube having openings therein above the shoulder means, a perforate central tube encircling the outlet tube and having a first end flange secured to one end, an annular plate concentric with and slidable on the central tube, sealing means supported by the plate engaging the plate and the central tube to prevent flow of unfiltered fluid therebetween, resilient means between the first end flange and plate urging them apart, a second end flange detachably secured to the end of the central tube opposite the first end flange adapted to engage a filter element in position around a central tube and hold it against the annular plate, means engaging the end of the outlet tube and the second end flange on the central tube to hold the central tube firmly in position around the outlet tube, said shoulder means engaging the first end flange secured to the central tube, and means closing the end of the outlet tube to prevent by-passing of the filter element by unfiltered fluid.

3. A support for a filter element comprising a casing having an inlet, an outlet tube extending into the casing, a cover closing the end of the casing, shoulder means secured to the outlet tube, said outlet tube having openings therein between the shoulder means and the end of the tube, a perforate central tube encircling the outlet tube and having a first end flange secured to one end, an annular plate concentric with and slidable on the central tube, sealing means supported by the plate engaging the plate and the central tube to prevent flow of unfiltered fluid therebetween, resilient means between the first end flange and plate urging them apart, a second end flange detachably secured to the end of the central tube opposite the first end flange adapted to engage a filter element in position around the central tube and hold it against the annular plate, means engaging the end of the outlet tube and the second end flange on the central tube to hold the central tube firmly in position around the outlet tube, said shoulder means engaging the first end flange secured to the central tube, gasket means between the first end flange secured to the central tube and the shoulder means, other gasket means between the second end flange and the means engaging the end of the outlet tube and means closing the upper end of the outlet tube to prevent flow of unfiltered fluid past the ends of the central tube.

4. In combination with a filter casing having an inlet, a perforate outlet tube extending into the casing, and a cover closing the casing, means for removably supporting a filter element within the casing comprising shoulder means on the outlet tube below the perforations therein, a perforate central tube encircling the outlet tube, a lower flange secured to the lower end of the central tube, an upper flange secured to the upper end of the central tube, one of said flanges being detachably secured to the tube, a plate slidable on the central tube between the upper and lower flanges, resilient means between the slidable plate and one of the flanges secured to the central tube adapted to urge the slidable plate against a filter element positioned between the plate and the other flange, means secured to the upper end of the outlet tube engaging the upper flange to hold the central tube firmly in position around the outlet tube with the lower flange against the supporting flange, and means closing the outlet tube to prevent by-passing of the filter element by unfiltered fluid.

5. A support for a filter element comprising a casing having an opening providing communication between the inside and outside of the casing, a tube extending into the casing providing a conduit from the inside to the outside of the casing, a cover closing the upper end of the casing, shoulder means secured to the tube, said tube having openings therein above the shoulder means, a perforate central tube encircling the tube and having a first end flange secured to one end, an annular plate concentric with and slidable on the central tube, resilient means between the first end flange and plate urging them apart, a second end flange detachably secured to the end of the central tube opposite the first flange adapted to engage a filter element in position around a central tube and hold it against the annular plate, means engaging the upper end of the tube and one of the flanges on the central tube to hold the central tube firmly in position around the outlet tube, said shoulder means engaging the other flange secured to the central tube, and means closing the end of the tube to prevent by-passing of the filter element by unfiltered fluid.

6. A support for a filter element comprising a casing having an inlet, an outlet tube extending into the casing, a cover closing the end of the casing, shoulder means secured to the outlet tube, said tube having openings therein above the shoulder means, a perforate central tube encircling the outlet tube and having a first end flange secured to one end, an annular plate concentric with and slidable on the central tube, sealing means supported by the plate engaging the plate and the central tube to prevent flow of unfiltered fluid therebetween, resilient means between the first end flange and plate urging them apart, a second end flange detachably secured to the end of the central tube opposite the first end flange adapted to engage a filter element in position around a central tube and hold it against the annular plate, means engaging the end of the outlet tube and one of the flanges on the central tube to hold the central tube firmly in position around the outlet tube, said shoulder means engaging the other flange secured to the central tube, and means closing the end of the outlet tube to prevent by-passing of the filter element by unfiltered fluid.

7. A support for a filter element comprising a casing having an inlet, an outlet tube extending into the casing, a cover closing the end of the casing, shoulder means secured to the outlet tube, said tube having openings therein above the shoulder means, a perforate central tube encircling the outlet tube and having a first end flange secured to one end, an annular plate concentric with and slidable on the central tube, sealing means supported by the plate engaging the plate and the central tube to prevent flow of unfiltered fluid therebetween, resilient means between the first end flange and plate urging them apart, a second end flange detachably secured to the end of the central tube opposite the first flange adapted to engage a filter element in position around the central tube and hold it against the annular plate, means engaging the end of the outlet tube and one of the flanges on the central tube to hold the central tube firmly in position around the outlet tube, said shoulder means engaging the other flange secured to the central tube, gasket means between the first end flange secured to the central tube and the shoulder means, other gasket means between the second end flange and the means engaging the end of the outlet tube, and means closing the upper end of the outlet tube to prevent flow of unfiltered fluid past the ends of the central tube.

8. In combination with a filter casing having an inlet, a perforate outlet tube extending into the casing, and a cover closing the casing, means for removably supporting a filter element within the casing comprising shoulder means on the outlet tube below the perforations therein, a perforate central tube encircling the outlet tube, a lower flange secured to the lower end of the central tube, an upper flange secured to the upper end of the central tube, said upper flange being detachably secured to the tube, a plate slidable on the central tube between the upper and lower flanges, resilient means between the slidable plate and the lower flange secured to the central tube adapted to urge the slidable plate against a filter element positioned between the plate and the other flange, means secured to the other end of the outlet tube engaging the upper flange to hold the central tube firmly in position around the outlet tube with the lower flange against the supporting flange, and means closing the outlet tube to prevent by-passing of the filter element by unfiltered fluid.

9. Apparatus for the support of a filter element comprising a casing having an inlet, an outlet tube opening into the casing for the reception of filtered fluid, shoulder means secured around the outlet tube in a fluid-tight manner between the opening of the outlet tube and the casing, a central tube concentric with the outlet tube, a first end flange secured to one end of the central tube, a sliding annular plate mounted on said central tube, sealing means engaging the sliding annular plate and the central tube to prevent flow of fluid therebetween, resilient means engaging the first end flange and the sliding annular plate to urge them apart, a second end flange detachably secured to the end of the central tube opposite the first end flange and adapted to engage the end of a filter element surrounding the central tube between the sliding annular plate and the second end flange, said central tube having openings therein between the sliding plate and second end flange for the flow of fluid discharged from the filter element into the outlet tube, one of said end flanges resting on the shoulder means, means engaging the other end flange to hold the central tube firmly in position on the shoulder means around the outlet tube, and means for preventing direct flow of the fluid to be filtered past the end of the filter element opposite the shoulder means to prevent by-passing of the filter element by the unfiltered fluid.

10. Apparatus for the support of a filter element comprising a casing having an inlet, an outlet tube opening into the casing for the reception of filtered fluid, shoulder means secured around the outlet tube in a fluid-tight manner between the opening of the outlet tube and the casing, a central tube concentric with the outlet tube, a first end flange secured to one end of the central tube, a second end flange secured to the end of the central tube remote from the first end flange, one of said end flanges being detachably secured to the central tube, a sliding annular plate mounted on said central tube, sealing means engaging the sliding annular plate and the central tube to prevent flow of fluid therebetween, resilient means engaging the sliding annular plate and one of the end flanges to urge them apart and urge the annular plate against a filter element, the central tube having openings therein in the region of the filter element to permit flow of filtered fluid from the filtered element to the outlet tube, one of said end flanges resting on the shoulder means, means engaging the other end flange to hold the central tube firmly in position around the outlet tube, and means for preventing direct flow of the fluid to be filtered past the end of the filter element to prevent by-passing of the filtered element by unfiltered fluid.

SOUTHWICK W. BRIGGS.

REFERENCES CITED

The following references are of record in the file of this patent:

UNITED STATES PATENTS

| Number | Name | Date |
| --- | --- | --- |
| 256,853 | Pitt | Apr. 25, 1882 |
| 1,581,947 | Hobbs | Apr. 20, 1926 |
| 2,137,556 | Young | Nov. 22, 1938 |
| 2,364,617 | Bolser | Dec. 12, 1944 |
| 2,367,745 | Wicks | Jan. 23, 1945 |
| 2,454,030 | Besore | Nov. 16, 1948 |
| 2,454,033 | Briggs | Nov. 16, 1948 |
| 2,459,376 | Hallinan | Jan. 18, 1949 |